July 17, 1962   D. L. RANDALL ET AL   3,044,288
HUMIDIOMETER HYDROGEN TUBE ANALYZER
Filed Nov. 29, 1960   2 Sheets-Sheet 1
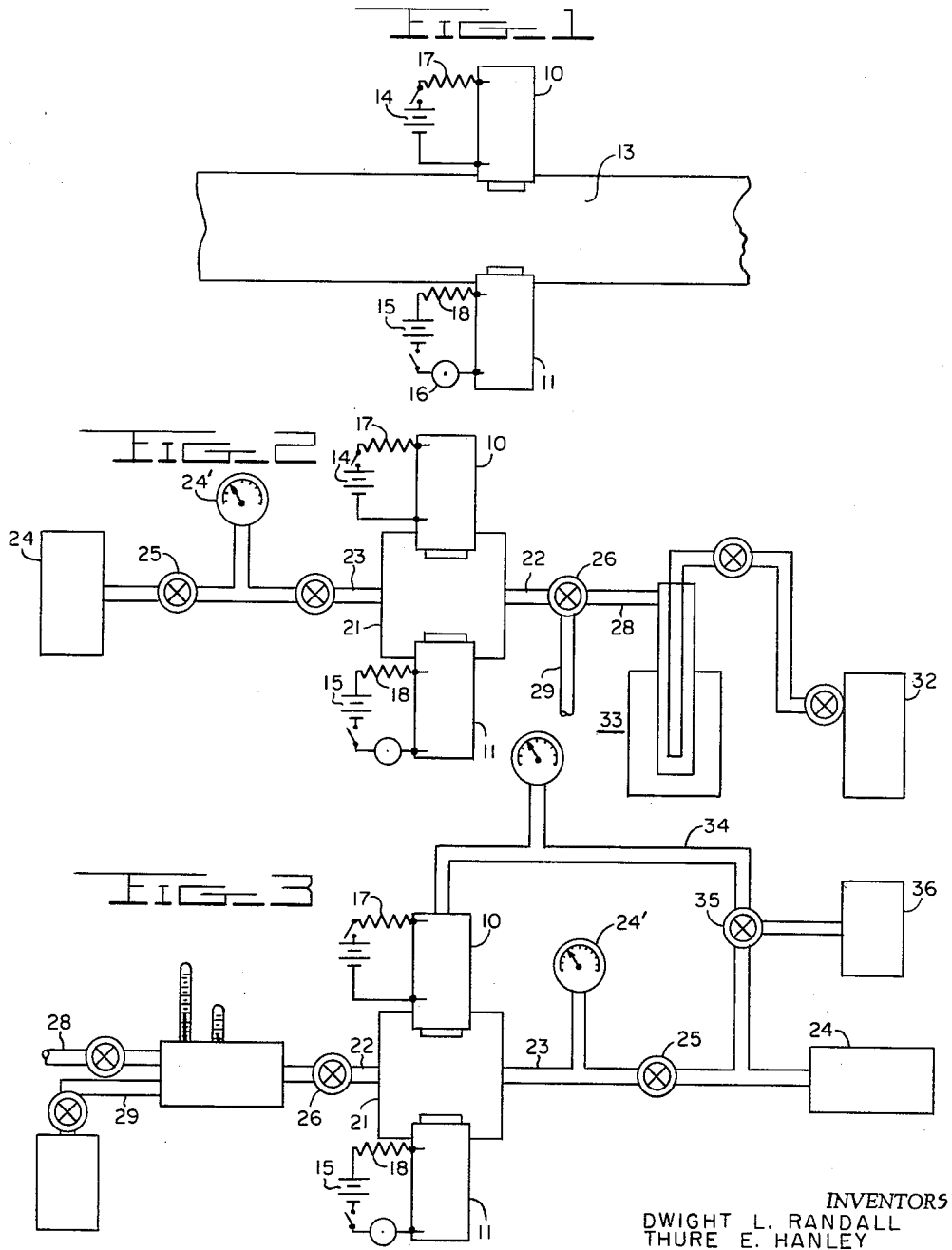
INVENTORS
DWIGHT L. RANDALL
THURE E. HANLEY
OLIVER K. LARISON
BY Melvin L. Crane, agent
Richard C. Reed ATTORNEY

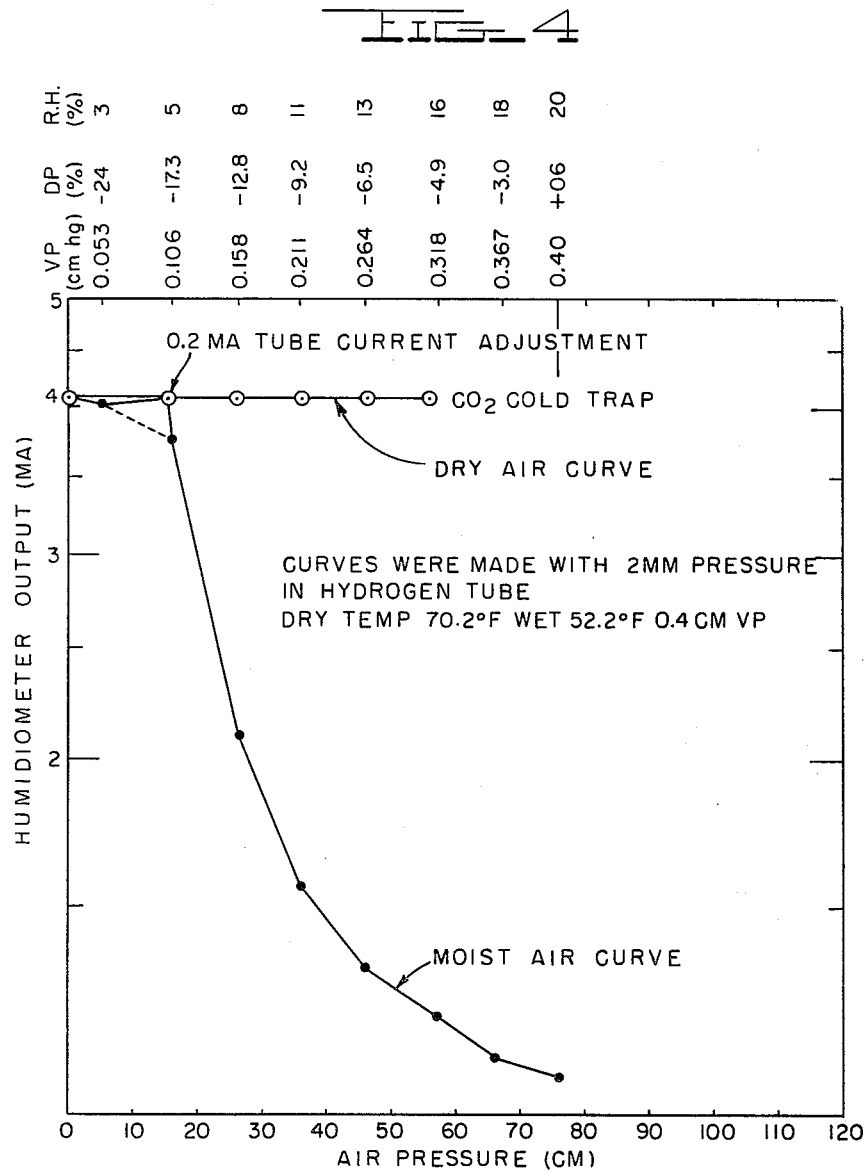

United States Patent Office 3,044,288
Patented July 17, 1962

3,044,288
HUMIDIOMETER HYDROGEN TUBE ANALYZER
Dwight L. Randall, 312 N. Edison St., Arlington, Va.;
Thure E. Hanley, Temple Hills, Md. (5245 Joan Lane, Washington 22, D.C.); and Oliver Kugler Larison, Oxon Hill, Md. (6327 Elkins Ave., Washington 21, D.C.)
Filed Nov. 29, 1960, Ser. No. 72,536
10 Claims. (Cl. 73—1)
(Granted under Title 35, U.S. Code (1952), sec. 266)

The invention described herein may be manufactured and used by or for the Government of the United States of America for governmental purposes without the payment of any royalties thereon or therefor.

The present invention is related to humidiometers and more particularly to a system for calibrating humidiometers and for determining the best pressure to fill the hydrogen tube of a humidiometer device to give maximum sensitivity to water vapor.

Heretofore a Lyman alpha humidiometer has been used in a device for measuring the water vapor content of air. The humidiometer is an instrument which uses the adsorption of Lyman alpha radiation at about 1216 A. by water vapor for measuring the water vapor content of the air. A hydrogen tube radiates Lyman alpha across a sampling path to a nitric oxide detector which has connected thereto suitable electrical circuitry to measure the output of the nitric oxide tube. It has been determined that the hydrogen tubes vary in their lifetime, sensitivity, output, etc.; therefore, it is a requirement that these humidiometers be calibrated to provide a satisfactory instrument. Also, it has been determined that hydrogen tubes function differently with different pressures of hydrogen in the tube. In the past in carrying out the calibration, several methods have been undertaken each of which are time consuming, requiring certain skills, and these methods must be performed maintaining an equilibrium of temperature, pressure and atmosphere, however, in the prior art systems these parameters are almost impossible to maintain. Consequently, even after recording the calibration data, one is not sure that the data is correct due to possible changes in the pressure, temperature or atmosphere that may take place during calibration.

It is therefore an object of the present invention to accurately calibrate the output of a humidiometer with known values of absolute humidity.

Another object is to determine the relative sensitivity of the radiation of a hydrogen tube to dry air and to water vapor.

Still another object is to determine the hydrogen pressure within a hydrogen tube which is best suited for giving maximum sensitivity to water vapor and a minimum to dry air.

Yet another object is to accurately calibrate a humidiometer in a relative short period of time.

Other and more specific objects of this invention will become apparent upon a more careful consideration of the following detailed description when taken together with the accompanying drawings in which:

FIG. 1 illustrates a simplified drawing of a water vapor density indicator;

FIG. 2 represents a diagrammatic form of the system used to carry out the invention in calibrating the tubes;

FIG. 3 illustrates a system for determining the best hydrogen pressure to be maintained in the hydrogen tubes, and FIG. 4 represents a calibration curve constructed by using the current output of the nitric oxide tube vs. the water vapor density.

The present invention comprises a system including a flush chamber through which light from a hydrogen tube radiates. A nitric oxide tube is positioned on the opposite side from the hydrogen tube to detect the light radiating across the flush chamber. A line and valve arrangement permits either dry or wet air to enter the chamber or closes the line off such that no air enters the chamber. The opposite side of the chamber has a vacuum or exhaust pump connected to a line and valve in the line which controls the air flow from the chamber to the vacuum pump. A pressure gauge is provided in the downstream side to indicate the pressure in the line and in the flush chamber. For the purposes of determining the best suitable hydrogen pressure to use in the hydrogen tube, a line is connected to the hydrogen tube and to the vacuum pump line and has a valve therein to admit hydrogen gas into the hydrogen tube from a hydrogen source, or to permit evacuation of the tube. A pressure indicator is in the line to show the pressure in the tube. A suitable indicator is connected to the detector to indicate the amount of water vapor in the air in accordance with the amount of light passing through the chamber from the hydrogen tube to the nitric oxide detector which is proportional to the current output of the detector.

Referring now to the drawings there is represented in FIG. 1 a schematic diagram of a humidiometer or water vapor density indicator as disclosed in a Naval Research Laboratory Report No. 5180 by D. L. Randall et al. entitled "An Airborne Lyman-α Humidiometer." The humidiometer comprises a hydrogen tube 10 with a lithium-fluoride window capable of producing a source of Lyman-alpha of about 1216 A. A nitric oxide tube 11 with a lithium fluoride window is disposed directly opposite to the hydrogen tube to detect the radiation source which crosses the passage 13 through which an air flow is directed in order to determine the humidity of the air. A suitable power source 14 of about 900 volts is connected to the hydrogen tube and a suitable power source 15 of about 45 volts is connected to the nitric oxide tube with a suitable indicator 16 connected in the detector tube circuit and each of the circuits includes load resistors 17 and 18. The indicator measures the current output of the tube and is calibrated to indicate the humidity in accordance with the current output of the nitric oxide tube due to photoionization in the tube caused by radiation from the hydrogen tube that penetrates the path through which the air flows. For the purpose of this invention humidity is defined as a general term which may be expressed as absolute humidity, water vapor density, relative humidity, dew point or vapor pressure.

It has been determined that hydrogen tubes cannot be made such that they give the same output, therefore for each tube the indicator must be calibrated to give the best results. It has also been determined that the lifetime and sensitivity of the tubes vary; therefore, it is desired to make tubes which will give long life and good sensitivity. Thus the system of the present invention has been made to provide hydrogen tubes with good sensitivity with long life and also provide a system by which the humidiometers can be calibrated to give the most accurate results.

FIG. 2 illustrates a system for calibrating the output of a humidiometer which uses a hydrogen tube 10 and nitric oxide detector 11 such as set forth above in the specification for the humidity indicator. The system includes a flush chamber 21 made of brass or any suitable material, through which light is radiated by a hydrogen tube 10 and detected by a nitric oxide tube 11. The flush chamber 21 is provided with an inlet line 22 through which either dry air or wet air is admitted and an outlet line 23 which is connected to a suitable vacuum pump 24 for evacuating the flush chamber. The outlet line between the flush chamber and the vacuum pump has connected thereto a pressure gauge 24' for indicating the pressure in the outlet line and a stopcock valve 25 in the line between the pressure gauge connection and the vacuum pump for closing off the outlet line. The inlet line is provided with a three-way stopcock valve 26 to close off the inlet line just prior to the flush chamber and has connected thereto a line 28 for admitting dry air and a line 29 for admitting wet air. Each of the lines 28 and 29 are provided with temperature indicating means for indicating the temperature of the wet and dry air that is admitted to the flush chamber. The dry air is admitted from a tank 32 and the air passes through a suitable cold trap 33 prior to the dry air admittance to the flush chamber. The cold trap freezes out any moisture which may happen to be in the tank or line and insures that the air admitted from the tank to the flush chamber is dry. The air that is admitted to the chamber obtains the measured equilibrium temperature of the chamber. In operation for calibration of the humidiometer the hydrogen tube and nitric oxide tube are secured in place in the walls of the flush chamber. The detector tube is turned on and the dry and wet bulb temperatures are measured at ambient pressure. The humidity indicating meter is zero set with the hydrogen tube off and the nitric oxide tube on, then the reading is recorded with the hydrogen tube at ambient temperature and pressure. Surrounding wet air of known humidity is drawn into the system at ambient pressure then the stopcock 26 is closed to prevent further admittance of air into the flush chamber. The deflection on the meter is then recorded at ambient pressure and temperature. With the stopcock 26 closed the exhaust or vacuum pump is started and the pressure is reduced to 700, 600, 500, 400, 300 millimeters of mercury as read on the pressure gauge. For each of the mentioned pressures, the flush chamber is isolated from the vacuum pump by closing stopcock 25 and the meter reading is recorded. Also, at each of the different pressures, the ambient pressure is recorded. The same procedure is carried out to record the readings of the dry air admitted into the flush chamber and the values at ambient pressure as well as at 700–300 millimeters of mercury are recorded as described above.

A calibration curve can be constructed by using the current output of the NO tube vs. the water vapor density in the flush chamber. The vapor density depends on the water vapor pressure which is computed by the following equation: $e=(e_0/p_0)P$ where $e$ is the vapor pressure in the flush chamber; $e_0$ is the vapor pressure at ambient pressure computed from the wet and dry bulb readings; $p_0$ is the ambient pressure; and $P$ is the pressure in the flush chamber as indicated by the pressure gauge.

The density, $r$, is then computed by the following equation:

$$r=e/RT \text{ gm./cc.}$$

$r=2.16612\times10^{-4}e/T$ where $e$ is in mbs. and the temperature is measured in degrees absolute.
$r=2.88784\times10^{-4}e/T$ where $e$ is in millimeters and the temperature is measured in degrees absolute.

Not only is the system good for calibrating the humidiometer, it can be used to determine the hydrogen pressure required in each tube for the best performance and sensitivity. This is carried out by connecting the outer end of the hydrogen tube to a line 34 which is connected into the evacuation line between the valve 25 and the vacuum pump. The line 34 includes a control valve 35 which controls the admittance of hydrogen from a hydrogen tank 36 into the tube at a desired pressure as indicated by pressure gauge 37 and when set in a different position permits evacuation of the hydrogen tube if desired. In operation, hydrogen is admitted into the tube at a low pressure of about 1.4 mm. Hg and a sensitivity reading or output of the NO tube is recorded using wet air and then dry air. The hydrogen pressure in the tube is then increased and the sensitivity again checked using wet and then dry air. This is continued until a maximum hydrogen pressure is found which will still be insensitive to dry air. The desired pressure is one which gives a maximum sensitivity to water vapor or wet air and a minimum sensitivity to dry air. It has been determined that if the pressure in the hydrogen tube is too high, a molecular hydrogen spectrum will be produced which will cause absorption by oxygen in the narrow oxygen window at about 1216 A. If the pressure is too low, the tube life will be short. The above procedure will determine the best pressure required in the tube for the best performance and maximum life of the tube.

Before a hydrogen tube is accepted, it should be checked to determine its operability for both wet and dry air. A quick check of the tube can be carried out by placing the hydrogen tube in the flush chamber system evacuating the flush chamber to a pressure of about 5 or 6 mm. of Hg and recording the deflection of the meter according to the output of the NO tube. Then dry air is admitted from the dry tank until the pressure in the flush chamber is about 760 mm. of Hg. A deflection greater than $\pm 0.05\%$ indicates an unacceptable tube.

Satisfactory humidiometers making use of the hydrogen tube as a source and a NO tube as a detector can measure relative humidity from about 80% to 5% with respect to a saturation vapor pressure corresponding to a temperature of 72° F. The instrument has a response time of about 1/10 second as limited by the associated metering system. With a spacing of about two centimeters between the source and detector, and the device has a maximum sensitivity from about 20% to about 50% relative humidity region. The range of the instrument can be changed by varying the length of the wafer vapor sampling path or by changing the size of the drop resistor in the metering circuit.

Obviously many modifications and variations of the present invention are possible in the light of the above teachings. It is therefore to be understood that within the scope of the appended claims the invention may be practiced otherwise than as specifically described.

What is claimed is:

1. Apparatus for calibrating a humidiometer comprising a hydrogen tube source and a nitric oxide detector which comprises a flush chamber adapted to secure said hydrogen tube and said nitric oxide tube in opposing sides thereof with their windows opposing each other, inlet and outlet lines secured to said flush chamber, valve means connected in said outlet line, a flush chamber pressure indicator means secured to said outlet line between said valve means in said outlet line and said flush chamber, a valve selector means in said inlet line adapted to admit dry air when in one position and wet air when in another position, and an exhaust pump means secured to said outlet line.

2. Apparatus for calibrating a humidiometer comprising a hydrogen tube and a nitric oxide tube as claimed in claim 1 which includes means to indicate the humidity of air admitted into said inlet line by said selector valve.

3. An apparatus for calibrating a humidiometer comprising a hydrogen tube and a nitric oxide detector which comprises a flush chamber adapted to secure said hydrogen tube and said nitric oxide detector in opposite sides thereof with their windows opposing each other, inlet and outlet lines secured to said flush chamber, valve means secured in said outlet line, a pressure indicator means secured to said outlet line between said valve means in said outlet line and said flush chamber, a valve selector means secured in said inlet line, a line connected with said valve selector means opening into the surrounding atmosphere, another line connected with said valve selector means and connected to a supply of dry air, said selector valve in said inlet adapted to supply dry air to said flush chamber when in one position and wet air into said chamber when in another position, and an exhaust pump connected to said outlet line adapted to evacuate said flush chamber.

4. Apparatus for calibrating a humidiometer comprising a hydrogen tube and a nitric oxide tube as claimed in claim 3 which includes means to indicate the humidity and temperature of air admitted into said inlet line by said selector valve.

5. Apparatus for determining the best pressure of hydrogen to fill a hydrogen tube of a humidiometer which comprises a flush chamber adapted to secure a hydrogen tube in one wall thereof, a nitric oxide detector secured in a wall of said chamber opposite to the wall adapted to secure said hydrogen tube therein, an electrical metering circuit connected to the output of said nitric oxide detector, an electrical input circuit adapted to be connected to said hydrogen tube, inlet and outlet lines connected to said flush chamber, valve means connected in said outlet line, a pressure gauge connected to said outlet line between said valve in said outlet line and said flush chamber, an exhaust pump connected to said outlet line, an exhaust line connected at one end to said outlet line between said valve and said exhaust pump with the other end of said exhaust line adapted to be connected to said hydrogen tube, a selector valve in said exhaust line that connects with said hydrogen tube, said selector valve adapted to admit hydrogen into the hydrogen tube when in one position and to exhaust said hydrogen tube when in another position and a second selector valve connected into said inlet line to admit wet air into said flush chamber when in a first position and to admit dry air into said flush chamber when in a second position, said second selector valve adapted to close off said inlet line when in a third position.

6. Apparatus as claimed in claim 5 which includes a pressure indicator in said line connected between said exhaust line and said hydrogen tube.

7. A method of calibrating a humidiometer comprising a hydrogen tube and a nitric oxide detector which comprises radiating a Lyman alpha source from said hydrogen tube across a sampling path, admitting a sample of wet air into said sampling path at ambient pressure and temperature, detecting the radiation penetrating said wet air and recording the electrical output of said detector, reducing the pressure of said sample in equal steps and recording the ambient pressure and the electrical output of said detector for each reduced pressure reading, subsequently admitting a sample of dry air into said sampling path at ambient pressure and temperature, recording the electrical output reading of said detector, reducing said pressure in equal steps and recording the ambient pressure and the electrical output of said detector for each reduced pressure reading.

8. The method claimed in claim 7 wherein the pressure in said flush chamber is reduced from ambient pressure in steps of about 100 millimeters of mercury pressure.

9. A method of determining the best suitable hydrogen pressure in a hydrogen tube for maximum sensitivity to water vapor which comprises mounting the window end of said hydrogen tube in an opening in one wall of a flush chamber opposite to the window of a detector secured to one wall of said flush chamber, connecting a hydrogen pressure and exhaust line to said hydrogen tube, exhausting said hydrogen tube and then admitting a small amount of hydrogen into said tube at a known low pressure, admitting wet air into said flush chamber at ambient pressure and temperature, recording the sensitivity of said hydrogen tube, increasing the hydrogen pressure in the tube in equal pressure steps and recording the sensitivity of said tube at the different steps, evacuating said wet air from said flush chamber and the hydrogen from said hydrogen tube, admitting dry air into said flush chamber at ambient pressure and temperature, admitting hydrogen into said hydrogen tube at a low pressure, recording the sensitivity of said tube, subsequently increasing the hydrogen pressure in said hydrogen tube in equal pressure steps, and recording the sensitivity of said hydrogen tube at each pressure step, whereby the best pressure can be determined by the sensitivity recordings.

10. The method as claimed in claim 9 wherein the pressure admitted into said hydrogen tube ranges from about 0.01 millimeters of mercury to about 100 millimeters of mercury.

References Cited in the file of this patent
UNITED STATES PATENTS

| | | |
|---|---|---|
| 2,908,820 | Parsons | Oct. 13, 1959 |
| 2,918,578 | Friedman | Dec. 22, 1959 |